No. 895,279. PATENTED AUG. 4, 1908.
J. F. LYMAN.
SNAP HOOK.
APPLICATION FILED AUG. 16, 1907.

Witnesses

Inventor
John F. Lyman,
By
Attorneys

UNITED STATES PATENT OFFICE.

JOHN F. LYMAN, OF MONTEBROOK FARM, VIRGINIA.

SNAP-HOOK.

No. 895,279.  Specification of Letters Patent.  Patented Aug. 4, 1908.

Application filed August 16, 1907. Serial No. 388,870.

*To all whom it may concern:*

Be it known that I, JOHN F. LYMAN, citizen of the United States, residing at Montebrook Farm, in the county of Prince Edward and State of Virginia, have invented certain new and useful Improvements in Snap-Hooks, of which the following is a specification.

This invention has for its object to provide a hook for use in connection with harness straps, rods and the like for coupling the same, and has for its object to devise a hook of this nature which may be cheaply manufactured, conveniently operated and which is secure against casual opening.

For a full understanding of the invention and the merits thereof and also to acquire a knowledge of the details of construction and the means for effecting the result, reference is to be had to the following description and accompanying drawings.

Figure 1:
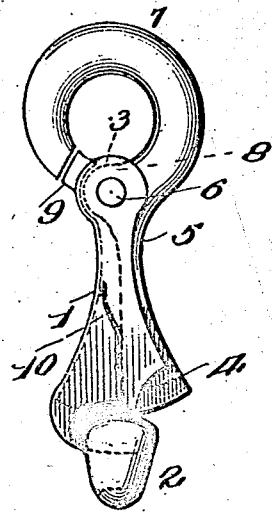
Figure 4:
Figure 2:
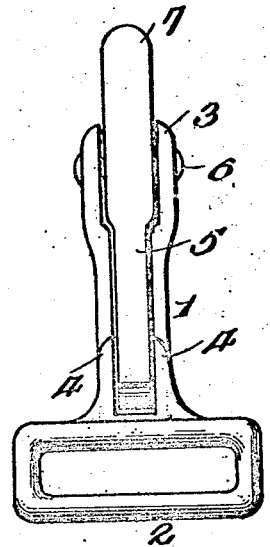
Figure 3:
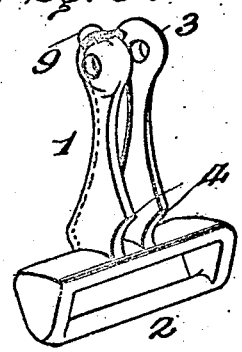

While the invention may be adapted to different forms and conditions by changes in the structure and minor details without departing from the spirit or essential features thereof as defined by the appended claims, still the preferred embodiment is shown in the accompanying drawings, in which:

Figure 1 is a side view of a snap hook embodying the invention. Fig. 2 is a front view of the hook. Fig. 3 is a detail view in perspective of the body portion of the hook. Fig. 4 is a detail perspective view of the combined hook and lever.

Corresponding and like parts are referred to in the following description and indicated in all the views of the drawings by the same reference characters.

The body 1 of the hook is provided at one end with a loop 2 and at its opposite end with a head 3 and tapers throughout its length towards the head 3. The body 1 of the hook comprises transversely spaced portions, which may be formed in any manner, as by recessing the said body in one side. A corner of the body adjacent to the loop 2 is cut away, as indicated at 4, to provide a finger notch to admit of compressing the latch lever to an extent to insure opening of the hook when it is required to place a ring, link, eye, or the like therein or to remove the same from the hook.

A lever 5 is fitted in the opening or space formed between the separate parts of the body 1 and is pivoted to the head 3 at 6 by means of a rivet or like fastening. A hook 7 is formed at the outer end of the lever 5 and is somewhat rounding in transverse section, although it may be of any outline. The hook 7 springs from the pivoted end of the lever 5, and at the juncture of the hook with the lever a widened portion 8 is provided corresponding approximately to the outline of the head 3 and is transversely apertured to receive the pivot fastening 6. When the parts are in normal position, the outer edge of the lever 5 corresponds approximately to the outline of the adjacent edge of the body 1, the lower end of the lever projecting beyond the finger notch 4 so as to be engaged by the thumb or finger of the hand when it is required to open the hook by inward pressure upon the lower end of the lever 5.

The hook 7 is closed by a projection 9 at the outer end of the body 1, said projection forming a stop against which the extremity of the hook 7 engages, thereby limiting the outward movement of the lever 5 at its free end. A spring 10 is interposed between the body 1 and lever 5 and exerts an outward pressure upon the free end of said lever 5 to press the same outward and hold the hook 7 closed.

Having thus described the invention, what is claimed as new is:

1. A snap hook comprising a body having a loop at one end and comprising transversely spaced portions, a lever inserted between the spaced portions of the body and pivoted at one end thereto, a hook projected from the pivoted end of the lever and normally closed by the outer end of the body, and a spring interposed between said lever and the body and arranged between the spaced portions of said body so as to be protected thereby.

2. A hook comprising a tapered body having a loop at one end and a projection at its opposite end, and having a portion adjacent to the loop cut away to provide a finger notch, said body comprising transversely spaced portions, a lever inserted between the spaced portions of the body and pivoted at one end thereto, a hook forming a part of said lever and closed by the aforesaid projection, and a spring normally exerting an outward pressure upon the free end of the lever and confined between it and the said body.

3. A hook comprising a tapered body having portions transversely spaced and provided at one end with a loop and having a corner portion adjacent to said loop cut away to provide a finger notch, said body having a head at its other end and a projection extended from said head, a lever inserted between the spaced portions of the body and pivoted at one end to the head thereof, a hook projected from the pivoted end of the lever and normally closed by the projection of the said head, and a spring normally exerting an outward pressure upon the lever and confined between it and the body and arranged in the space formed between the separate parts of the body.

In testimony whereof I affix my signature in presence of two witnesses.

JOHN F. LYMAN. [L. S.]

Witnesses:
   Geo. O. Petters,
   A. B. Hanmer.